Aug. 22, 1950 G. W. MORK 2,519,974
TRACTOR-IMPLEMENT SUPPORTING CRADLE
Filed June 19, 1947 7 Sheets-Sheet 1

INVENTOR,
George W. Mork,
BY Roger Sherman Hoar
ATTORNEY

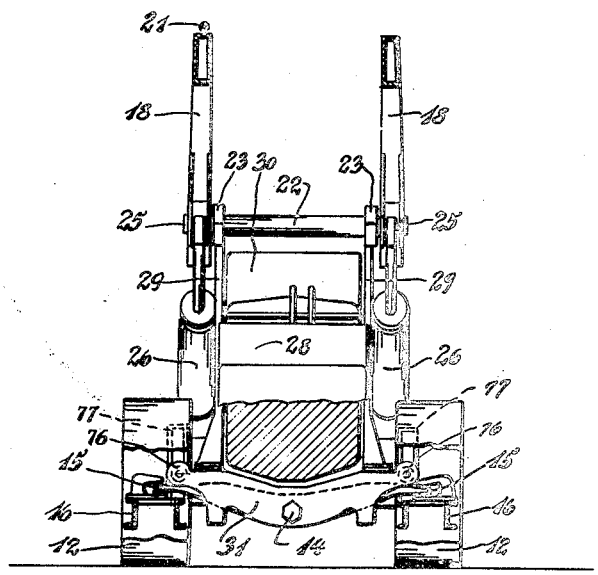

Aug. 22, 1950     G. W. MORK     2,519,974
TRACTOR-IMPLEMENT SUPPORTING CRADLE
Filed June 19, 1947     7 Sheets-Sheet 5

George W. Mork,
INVENTOR,
BY Roger Sherman Hoar
ATTORNEY.

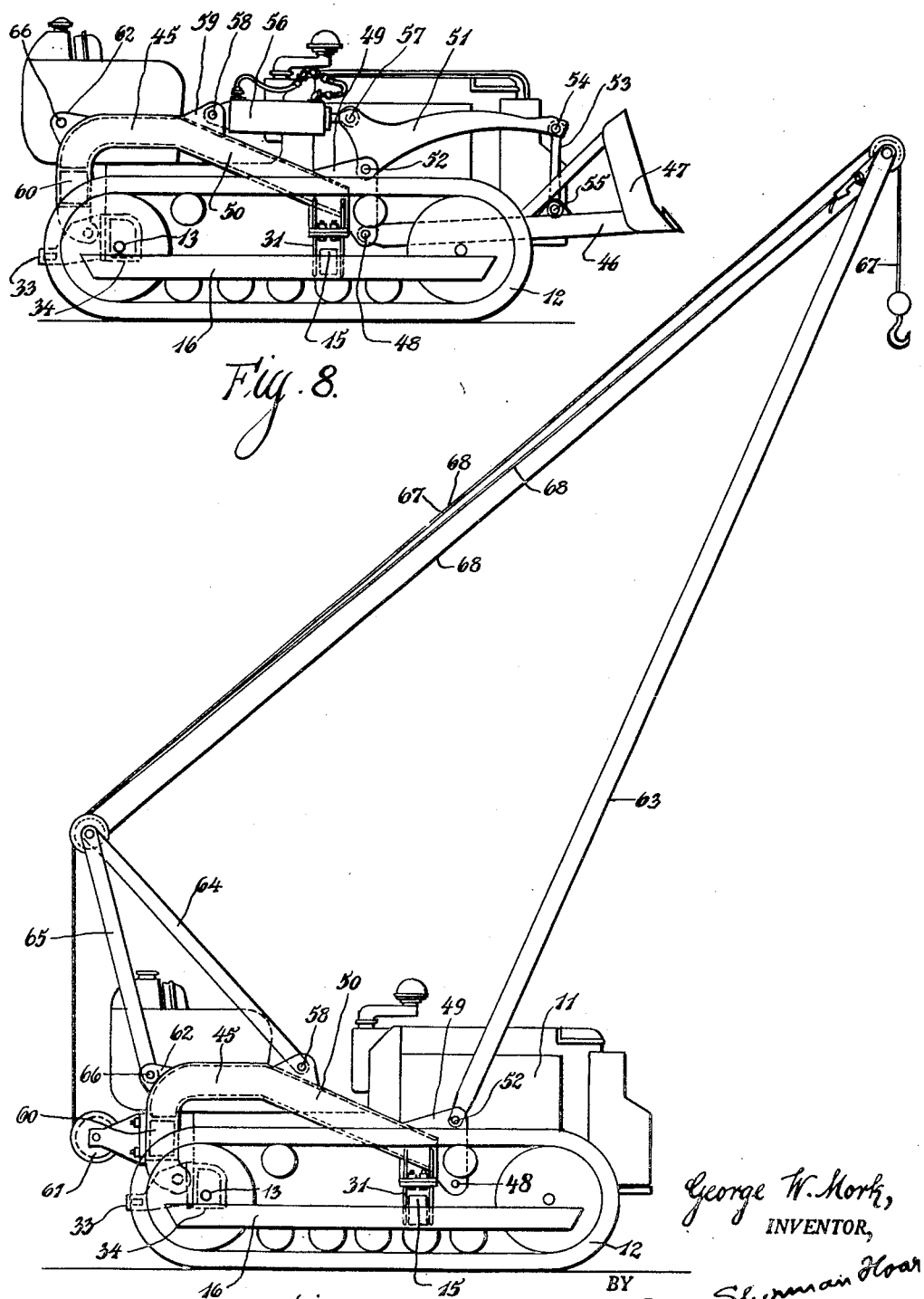

Patented Aug. 22, 1950

2,519,974

UNITED STATES PATENT OFFICE 2,519,974

TRACTOR-IMPLEMENT SUPPORTING CRADLE

George W. Mork, South Milwaukee, Wis., assignor to Bucyrus-Erie Company, South Milwaukee, Wis., a corporation of Delaware Application June 19, 1947, Serial No. 755,605

27 Claims. (Cl. 214—140)

My invention relates to new and useful improvements in tractor-mounted material-handling implements, more particularly to the mounting of the supporting arms and operating means of such implements on the tractor.

This is a continuation-in-part (i. e. a continuation as to all common subject matter) of my application, Serial No. 750,268, filed May 24, 1947 and abandoned without prejudice to this present application on July 3, 1947, for improvements in Tractor-Implement Supporting Cradle.

In machines of the type to which my invention is more particularly adapted, namely tractor shovels, bulldozers, and tractor cranes, the implement proper is usually mounted on the end of two arms, which straddle the tractor laterally, are pivotally supported by the tractor main frame and/or its traction units, and extend in front of or behind the tractor. Suitable power means is provided for raising and lowering the implement supporting arms. A traction unit is located at each side of the tractor, and may consist of wheels or of a swing frame on which are mounted suitable ground-supports, such as a creeping track, wheels in tandem, runners or skids. The rear of the tractor main frame is supported by a transverse axle which extends across from one swing frame to the other. The forward part of the tractor main frame is supported through an equalizing bolster (or other equalizing means) which permits limited independent movement of the wheels or of the swing frames as the tractor travels over uneven ground. Quite frequently the transverse axle serves also as the axle for the two rear wheels of a wheeled ground-support, or for the two rear tumblers of creeping traction ground-supports.

The principal object of my invention is to improve the mounting on the tractor of implement supporting arms and operating means, with the following ends in view, namely:

(1) To provide a mounting in the form of a cradle, which will transmit all digging reactions and load-lifting reactions to the ground through the traction units, without passing through the tractor main frame, and without affecting independent movement of the traction units relative to each other as the tractor travels over uneven ground.

(2) To provide a cradle mounting supported on the traction units utilizing the same means that supports the tractor main frame on the traction units.

(3) To provide a cradle mounting that will withstand torsional stresses imposed thereon by the implement-supporting arms.

(4) To provide a cradle mounting that can be readily attached to a tractor with minimum alteration of the tractor.

(5) To provide a cradle mounting that can be readily used for mounting a crane in place of a tractor shovel, or bulldozer, without alteration of either the tractor or the cradle.

(6) To provide a cradle mounting such that the center of gravity of the whole attachment is substantially in vertical alignment with the center of gravity of the bare tractor, thereby preserving its balance.

(7) To provide a cradle mounting that will be simple and inexpensive to manufacture.

(8) To provide a cradle mounting that will permit the implement supporting arms and operating means to be located inside the outer edges of the traction units, thereby providing a machine that requires no greater transverse clearance than the tractor itself.

(9) To provide a cradle mounting that will permit the use of substantially lighter and simpler implement supporting arms and operating means.

(10) To provide a cradle mounting that will permit the use of implement supporting arms and operating means that will provide unobstructed vision for the operator at all times.

(11) To provide a cradle mounting that will protect the operator from jack-knifing of parts.

(12) To provide a cradle mounting consisting of a tractor attachment and an implement attachment, the tractor attachment being suitable for incorporation as part of any of several types of tractor and adaptable for supporting connection to any of several types of implement attachment.

(13) To provide a cradle mounting that will relieve the front of the tractor frame from stress due to excessive vertical swinging and lateral deflection of the swing frames relative to each other and will equalize and transfer such stress back into the swing frames through the rear axle and front bolster of the tractor.

In addition to the objects above stated, I have worked out a number of novel and useful details, which will be readily evident as the description progresses.

My invention consists in the novel parts, and in the combination and arrangement thereof, which are defined in the appended claims, and of which two embodiments are exemplified in the accompanying drawings, which are hereinafter particularly described and explained.

Throughout the description, the same reference number is applied to the same member or to similar members.

Referring now to the accompanying drawings, it will be seen that:

Figure 3 is a front elevation, partly in section, of the same embodiment, taken along the line 3—3 of Figure 1.

Figure 4 is a rear elevation of the same embodiment, taken along the line 4—4 of Figure 1.

Figure 8 is a side elevation of a bulldozer mounted on a cradle representing a second embodiment of my invention.

Figure 9 is a side elevation of my second embodiment, showing, as a second variant of this embodiment, a crane attached to the same cradle.

Figure 1:
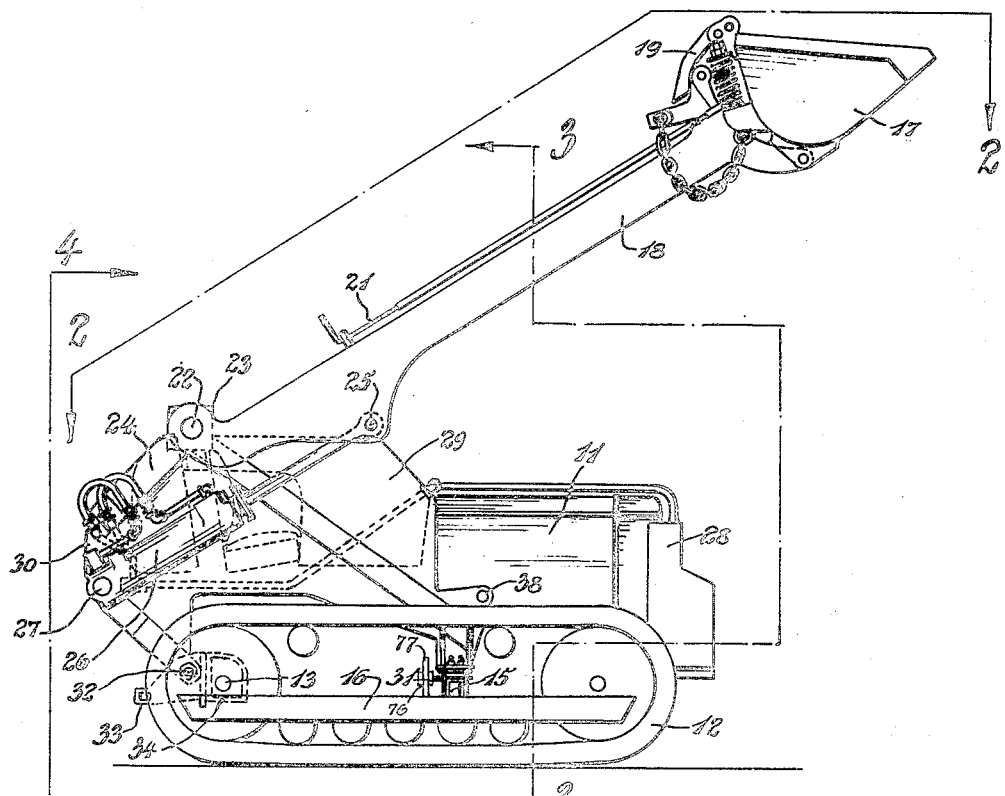
Figure 1 is a side elevation of a tractor shovel mounted on a cradle representing the first and preferred embodiment of my invention.
Figure 2:
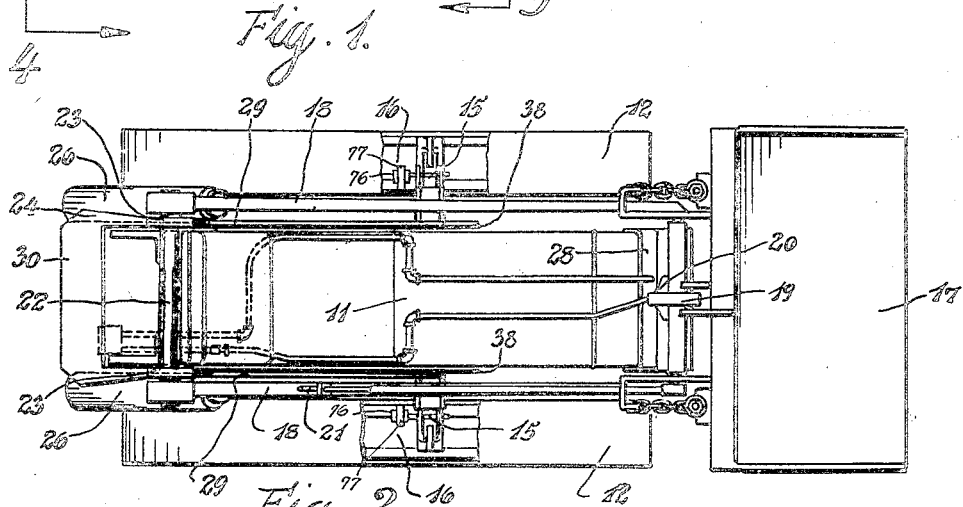
Figure 2 is a plan of the same embodiment, taken along the line 2—2 of Figure 1.

Referring now to Figures 1 to 5, showing my first embodiment, suitable for mounting a tractor-shovel on a tractor, we see that 11 is the main frame of a conventional tractor, supported by two swing frames, which in this embodiment are creeping traction units 12, independently oscillable about rear axle 13 which supports the rear portion of the main frame. The front portion of main frame 11 is pivotally supported at 14 (Figure 3) on the center of cross-bolster 15, each end of which is in turn slidably supported on, but restrained from vertical movement relative to, swing frame 16 of one of the traction units 12, thereby equalizing for the relative oscillation of the swing frames. These details of the tractor form no part of my invention.

The implement supported by the cradle of my first embodiment is a dumpable digging dipper 17 pivoted at the forward end of supporting arms 18. The dipper is held in load-carrying position, as shown in Figure 1, by a dipper latch 19, which can be tripped by lever 20 (Figure 2) controllable in a conventional manner as by operating rod 21.

In place of dipper 17, I could substitute any alternative material-handling implement (such as the dumping bulldozer blade of my Patent No. 2,303,379, granted December 1, 1942) without thereby departing from the spirit of my invention.

Turning now to the subject-matter of my invention, we see that the rear ends of supporting arms 18 (upturned for better vision over the arms) are rigidly connected by cross-shaft 22 which is pivotally mounted in split bearings 23 at a high rearward point on each side of cradle 24. At an intermediate point on each arm 18, as by pivot 25, there is pivoted an hydraulic cylinder-piston assembly 26 which is also pivotally supported on cradle 24 at a rearward and relatively low point as by pivot 27. As shown in my drawings, but not necessarily so limited, each of pivots 25 comprises, as pivot elements, bearings in arm 18 and at the end of the piston-rod of cylinder-piston assembly 26, and pins or bolts in these bearings; and each of pivots 27 comprises, as pivot elements, a stub-shaft projecting from the side of cradle 24 and a bearing for said shaft at the rear end of the cylinder of cylinder-piston assembly 26. The two cylinders are interconnected and their pistons are actuated by pressure fluid supplied from a conventional hydraulic unit 28 at the front of the tractor.

Figure 5:
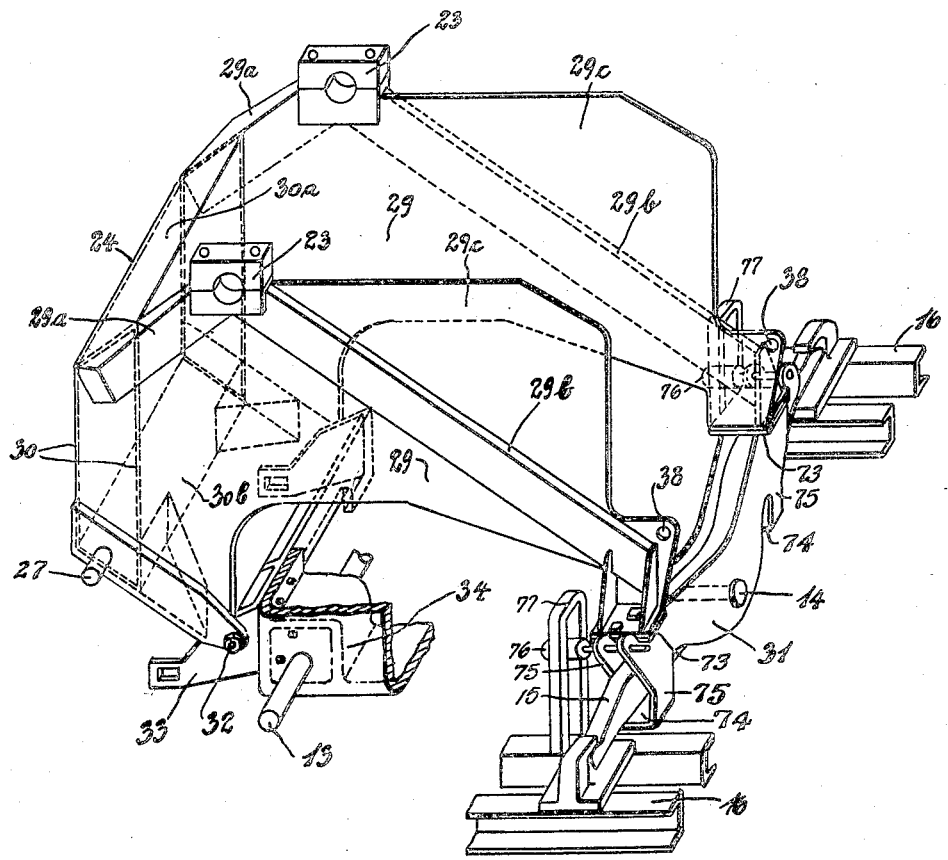
Figure 5 is an isometric view of the same embodiment, taken from above to the right in front, showing the cradle and the method of attaching it to the tractor.

Referring now more particularly to Figure 5, it will be seen that my cradle 24 consists of reinforced side plates 29, back plates 30, and front cross-beam 31 to the ends of which the side plates are bolted, and is supported at three points, i. e. at the center of cross-beam 31 which is pivotally supported on the center of cross-bolster 15 by pivot 14, and at each side of the tractor by pivots 32 to brackets 33 on that portion of the main frame just behind rear axle 13, preferably rear axle housing 34. As shown in my drawings, but not necessarily so limited, pivot 14 comprises, as pivot elements, a pin extending through bearings in cross-beam 31 and cross-bolster 15; and each of pivots 32 comprises, as pivot elements, bearings in cradle 24 and housing 34, and a bolt through such bearings. In this way it will be seen that digging and load-lifting reactions are transmitted to the ground through the cradle, through the rear axle and front bolster, and through the traction units, without passing through and stressing the tractor main frame.

The stress introduced by attaching the rear of the cradle to the main frame just behind the rear axle (Figures 1–5 and 7–9) instead of attaching it directly to the rear axle (Figure 6) can be neglected. Thus in either case the attachment can be considered to be "adjacent" the rear axle: i. e., either near, close, or contiguous thereto.

It will be noted that, although I show and prefer to use a pivotal connection between the rear of the cradle and the rear of the tractor main frame, in order to remove bending stresses from these parts, it is clear that any approximate equivalent of a pivotal connection could be used successfully for the same purpose. Accordingly in the claims I use the generic terms "flexibly connected," "flexibly secured," etc. as meaning pivotally connected or connected in such other manner as to remove bending stresses as above explained.

It will also be noted that the method of supporting my cradle on traction units 12 utilizes preferably the same means (i. e., the rear-axle 13 and front bolster 15) that is used to support the tractor body on the traction units, thus permitting normal free oscillation of the traction units. However, it is evident that, instead of using the same cross-bolster that supports the tractor main frame, a separate cross-bolster could be employed to support the front end of the cradle.

The use of a special cross-bolster (not a part of the normal tractor assembly) to serve as the cross-bolster of my invention, would of course be essential if the tractor had no cross-bolster, but instead employed some other form of equalizing means (for example, knee action). Furthermore, the cross-bolster which I employ to support my cross-beam 31 need not be wholly rigid as shown, but might well be resilient in whole or in part.

It will be seen that my cradle can be easily assembled on a tractor with practically no modification of the tractor, since the entire cradle preferably consists of only two parts (namely cross-beam 31 and the U-frame formed by side plates 29 and back plates 30), can be assembled by merely fitting the cross-beam 31 (which is in part U-shaped in cross-section) up around cross-bolster 15, bolting the beam to the sides of the cradle, and attaching the cradle to the tractor by bolting it to two brackets 33 and pinning it to cross-bolster 15.

Turning now to the structural features of my cradle, it will be seen that back plates 30 together with top and bottom plates 30a and 30b form a torsion box which is rigidly connected to the cradle sides and serves to distribute to the cradle sides and to the rear cradle supports any unequal forces imposed on the cradle by implement supporting arms. On each side of the cradle, side beams 29a and 29b extend respectively rearwardly to the torsion box and forwardly to the supporting cross-beam 31 and serve to transmit the implement load to these parts. Side plates 29 provide a stiffening web for each side of the cradle, the upper portions 29c serving also as guard plates to protect the operator from the jack-knifing between the implement arms and the sides of the cradle as the implement arms are lowered. Each side of my cradle may, indeed, be treated as a cantilever beam or truss projecting from its support 32 rearwardly to the torsion box and forwardly to cross-beam 31.

The guard plates 29c cooperate with the downwardly projecting plates, to which the piston rods of cylinders 26 are pivoted on implement arms 18.

It should be noted that, in addition to passing the front load of the cradle and of the implement to bolster 15 directly, rather than through the main frame of the tractor, the fact that my cross-beam 31 straddles cross-bolster 15 results in putting a balanced load on both the cross-beam and the cross-bolster, instead of an eccentric load.

Bed plates 73, bumper plates 74 between side plates 75, and guide rollers 76, on cross beam 31, and guide track 77 on swing frame 16, are adapted to be used on any of the variants of my invention and accordingly are described in detail hereinafter (see Figure 10).

Figure 6:
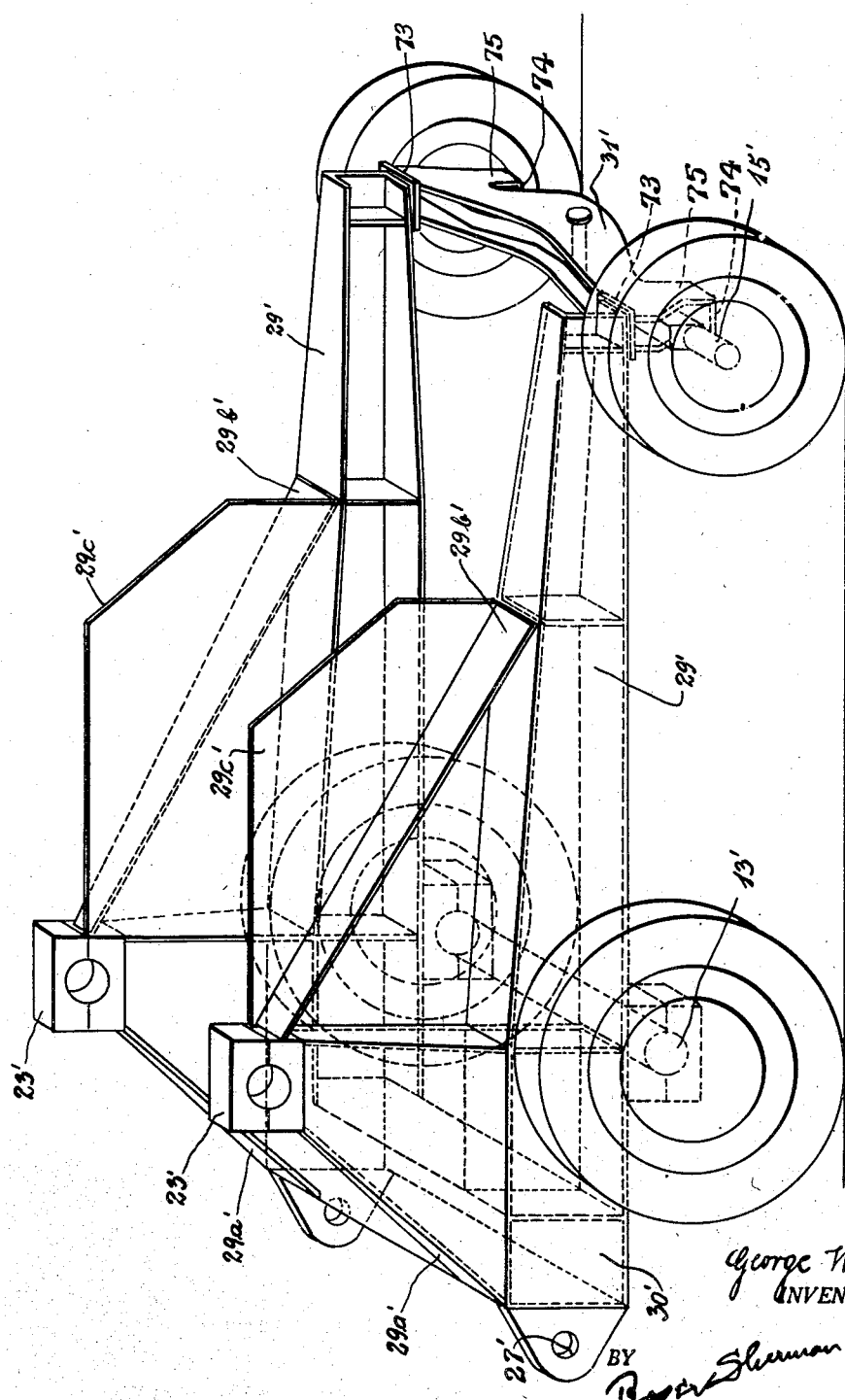
Figure 6 is a similar isometric view of a variant of the same embodiment.

Turning now to Figure 6, showing a variant of my first embodiment, we see that my tractor-shovel cradle can be adapted for a wheel-type tractor which has no swing frames. The rear wheels and the rear end of the cradle are mounted directly on the rear axle 13' of the tractor, and the front wheels and the front end of the cradle are mounted directly on the cross-bolster 15'. As in my first variant, the cradle consists of: cantilever side members 29' rigidly connected at the rear by torsion box 30' and at the front by cross-beam 31'; side members 29a' and 29b' which transmit the load from bearings 23' to torsion box 30' and to cross-beam 31'; and guard plates 29c' above side members 29b'. It will be seen that, as in the first variant, the torsion box 30' serves to impart bending stress to both side members 29', even when the thrust load imposed on the cradle by the implement supporting arms is distributed unequally between bearings 23'. Instead of the stub-shaft portion of pivot 27 of my first variant, 27' is a bearing which serves as a part of the pivot for the cylinder-piston assembly, not shown in Figure 6.

Figure 7:
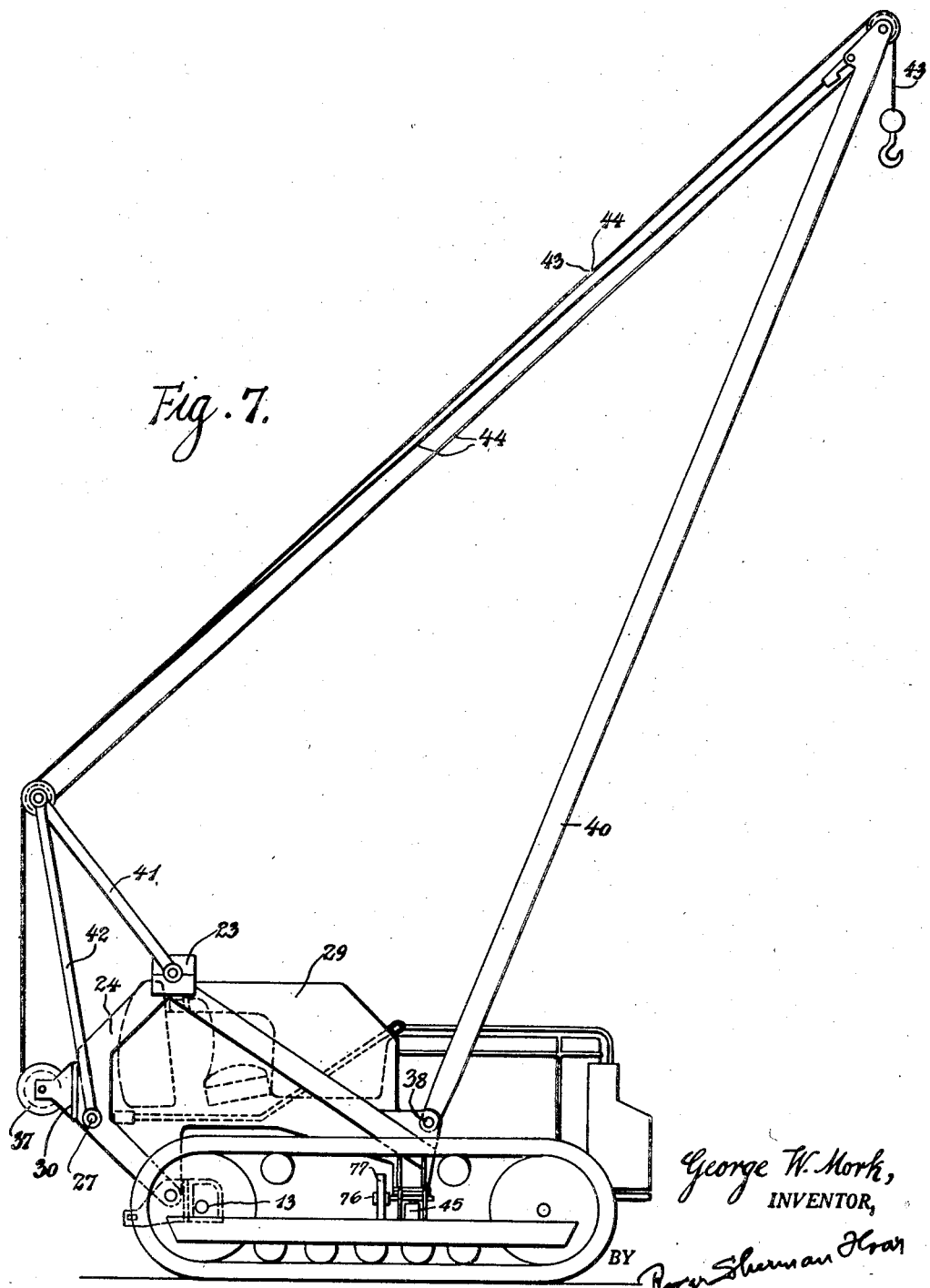
Figure 7 is a side elevation of my first embodiment, showing as a third variant of this embodiment, a crane attached to the same cradle.

Turning now to Figure 7, showing the third variant of my first embodiment, we see that my tractor-shovel cradle permits ready conversion from a tractor-shovel to a tractor-crane, if it is equipped with a winch 37 on back plate 30. Figure 7 shows the cradle of my first variant so adapted. The conversion is accomplished by removing the tractor-shovel supporting arms 18 and cylinder-piston assemblies 26 from the cradle 24, and installing, on each side of the cradle, boom legs 40 at pivots 38, A-frame front legs 41 at bearings 23, and A-frame back legs 42 at pivots 27. As shown in my drawings but not necessarily so limited, each pivot 38 comprises, as pivot elements, bearings in boom legs 40 and cradle 24 and a pin or bolt in these bearings. Winch 37 is a conventional winch with two drums (not shown) which control lifting-hook rope 43 and boom-hoist rope 44. Thus we see that conversion from a tractor-shovel to a tractor-crane can be accomplished without any alteration whatever to either the tractor or the cradle, the crane being assembled on the cradle by making three simple connections on each side of the tractor.

Turning now to Figures 8 and 9, showing my second embodiment, we see in Figure 8 another form of cradle 45 suitable for mounting a bulldozer on a tractor. On each side of the tractor, arm 46 rigidly supporting bulldozer blade 47 is pivoted at 48 on the bottom ears of lugs 49 at the forward end of beam 50 on the side of the cradle. Bell-crank 51 is pivoted at 52 on the upper ears of lugs 49. Link 53 is pivotally connected at 54 to the long arm of bell-crank 51 and at 55 to supporting arms 46. Hydraulic cylinder-piston assembly 56 is pivotally connected at 57 to the short arm of bell-crank 51 and at 58 to pivot ears 59 on side-beam 50. Hydraulic cylinder-piston assemblies 56, by pulling in or pushing out their pistons, can raise or lower the blade 47. It will be seen that the use of my cradle to mount a bulldozer in this manner achieves my object of a machine in which the bulldozer arms and other supporting parts are inside the outer edges of the tracks.

As in my first embodiment the center of cross-beam 31 at the front of the cradle is supported on equalizing cross-bolster 15 which rests on swing frame 16 of traction units 12, and the rear of the cradle is supported as near as possible to the rear axle 13 on brackets 33 on rear-axle housing 34. Torsion-box 60 forming the back of the cradle is suitable for mounting a winch 61 (Figure 9) which can be used to operate auxiliary equipment towed by the tractor or to operate a crane on the tractor as hereinafter described. Lugs 62 on side beams 50 at the rear of the cradle are also used to mount a crane, as hereinafter described, and are not used with the bulldozer.

Turning now to Figure 9, we see that, just as in the case of the first embodiment, the cradle of my second embodiment permits ready conversion from a bulldozer to a crane. The conversion is accomplished by removing the bulldozer supporting arms 46, bell-cranks 51, and cylinder-piston assemblies 56 from cradle 45, and installing, on the sides of the cradle, boom legs 63 at pivot 52, A-frame front legs 64 at pivots 58, and A-frame back legs 65 at pivots 66. Two drums (not shown) of conventional winch 61 control lifting-hook rope 67 and boom-hoist rope 68. Thus we see that when the cradle of my second embodiment, shown in Figures 8 and 9, is used, conversion from a bulldozer to a tractor-crane can be accomplished without any alteration to either the tractor or the cradle.

As shown in Figures 8 and 9, but not necessarily so limited, each of pivots 48, 52, 54, 55, 57, 58, and 66, comprises, as pivot elements, bearings in the two parts there pivoted together, and pins or bolts in these bearings.

Figure 10:
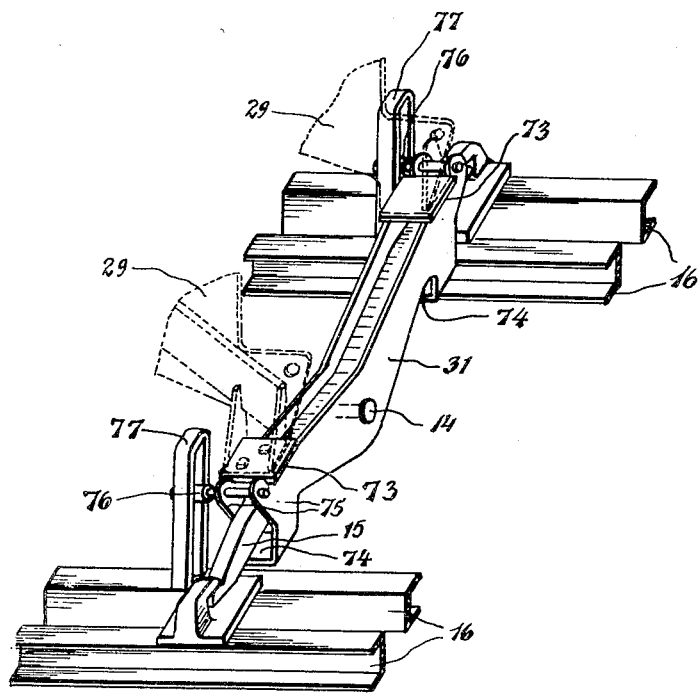
Figure 10 is an isometric view, taken from above to the right in front, showing the tractor attachment portion of the first embodiment of my cradle mounting.

Turning now to Figure 10, we see that it represents my cross-beam and bolster assembly (the tractor-attachment portion of my cradle mounting) which will normally be built and sold as a part of the tractor, rather than as a part of the tractor implement (tractor shovel, bulldozer, or crane, as the case may be), and which is adapted to be connected to any of various types of implement support or attachment (such as to the U-frame of the cradle, three types of which I have described). This cross-beam and bolster assembly (see Figure 10) has a single-point support (pivot 14 on bolster 15) that is independent of the tractor main frame, and provides the following features without subjecting the main frame to stress:

(1) Supports for the front ends of the U-frame of my implement supporting cradle (shown dotted). These supports consist preferably of bed plates 73, at each end of the cross beam 31, to which the cradle arms are readily bolted without disassembly of any portion of the tractor.

(2) Bolster bumpers. These consist preferably of bumper plates 74 joining the cross-beam side plates 75 under the ends of bolster 15.

(3) Guides to prevent independent lateral deflection of the tractor swing frames. These consist preferably of rollers 76 which are mounted on the ends of the cross beam and are adapted to run up and down within guide tracks 77 which are rigidly mounted (as by welding) on the swing frames 16.

In each of the above cases the front of the tractor main frame is relieved of stress which is instead taken up by the cross-beam 31 and distributed equally to the swing frames through pivot 14 and bolster 15, or to the rear axle of the tractor through the cradle U-frame. Furthermore, locating the bumper and guide means on the bolster-supported cross-beam which supports the cradle eliminates the need of a separate mounting on the tractor main frame and makes for a simpler and cleaner design.

Having now described and illustrated two alternative forms of my invention, I wish it to be understood that my invention is not to be limited to the specific forms or arrangements of parts herein described or shown.

I claim:

1. In a cradle for mounting an implement on a tractor of the sort having a main frame, a pivot shaft extending laterally from each side of one end of the main frame, swing frames pivoted at one end on the projecting ends of the pivot-shaft and adapted to oscillate independently in a vertical plane about said pivot shaft, and a cross-bolster supported by the other end of the swing frames; the combination of: a cross-beam centrally pivotally supportable by the cross-bolster; a cradle frame supported at one end by the ends of the cross-beam, and adapted at its other end to be supportably connected to the tractor adjacent the pivot shaft of the swing frames; said cradle frame including side members and a hollow torsion box rigidly connecting the side members; means on the cradle frame to support the frame of an implement; and means on the cradle frame to support power-actuated means to operate said implement.

2. A cradle according to claim 1, further characterized by the fact that the cradle frame is connectable to the housing of the pivot shaft of the swing frames.

3. A cradle according to claim 1, further characterized by the fact that the cradle frame is fore-and-aft U-shaped so as to be capable of embracing the sides and rear end of the tractor main frame.

4. A cradle according to claim 1, further characterized by the fact that the cross-beam comprises, at least at its center, two vertical members adapted to straddle the cross-bolster, and that the means for supporting this cross-beam on the cross-bolster comprises a substantially horizontal pin lying longitudinally of the tractor, and passing through two aligned holes in the two vertical members, and capable of passing through an aligned central hole in the cross-bolster.

5. A cradle according to claim 1, further characterized by the fact that the cradle is adapted to have a three-point support on the tractor, two support points being adjacent the pivot shaft, and the third support point being on the cross-bolster and independent of the tractor main frame.

6. A cradle according to claim 1, further characterized by having, adjacent each end of the cross-beam, a bumper for limiting vertical movement of the cross-bolster.

7. A cradle according to claim 1, further characterized by having, adjacent each end of the cross-beam, means for guiding the oscillation of the swing frames against lateral deflection.

8. A cradle according to claim 1, further characterized by the fact that the supporting means on the cradle frame to support the implement and the operating means therefor, comprise a pair of transversely aligned pivot elements one on each side of the cradle adjacent the rear thereof, and a pair of transversely aligned pivot elements one on each side of the cradle adjacent the front thereof, and a pair of transversely aligned pivot elements one on each side of the cradle intermediate the other two pairs.

9. A cradle according to claim 8, further characterized by the fact that the pair of pivot elements intermediate the rear and front pairs of pivot elements on the cradle is elevated relative to one of said rear and front pairs of pivot elements.

10. A cradle according to claim 9, further characterized by the fact that the cradle has a fourth pair of supporting pivot elements adjacent its front end.

11. In a material-handling implement for attachment to a tractor of the sort having a main frame, a pivot shaft extending laterally from each side of the rear of the main frame, a swing frame pivoted on each projecting end of the pivot-shaft and adapted to oscillate independently in a vertical plane about said pivot-shaft, and support means for the main frame supported by the front ends of the swing frames, the combination of: the implement proper; a cradle adapted to have a three-point support on the tractor, to-wit: a central pivotal support independent of the main frame by a cross-bolster supported by the front ends of the swing frames and a two-point flexible attachment to the tractor adjacent the pivot shaft; two supporting arms attached to the implement proper and pivotally supported on a transverse axis by the cradle; and power-actuated means supported by the cradle and operatively connected to the supporting arms whereby the implement proper is manipulated.

12. An implement according to claim 11, further characterized by the fact that the power-actuated means is a pair of hydraulic cylinder-piston assemblies pivotally supported by the cradle, on a transverse axis substantially lower than the transverse axis of pivotal support of the supporting arms on the cradle, that the cylinder-piston assemblies and the supporting arms are pivotally supported on the cradle adjacent the rear end of the cradle, and that the cradle is adapted to pivotally support a pair of supporting arms at a third transverse axis of pivotal support, located substantially forward of the two first-mentioned transverse axes of pivotal support.

13. An implement according to claim 11, further characterized by the fact that the power-actuated means is a pair of hydraulic cylinder-piston assemblies pivotally supported by the cradle at a transverse axis substantially above and behind the transverse axis of pivotal support of the supporting arms on the cradle, that there is a bell-crank pivotally connected to each of the cylinder-piston assemblies and to the cradle and operatively connected to each of the supporting arms, and that the cradle is adapted to support a pair of supporting arms at a fourth transverse axis on the cradle located substantially to the rear of the transverse axis of the first-mentioned supporting arms, the cylinder-piston assemblies, and the bell-cranks.

14. An implement according to claim 11, further characterized by the fact that the supporting arms have upturned rear ends at which they are pivoted to the cradle.

15. An implement according to claim 11, further characterized by the fact that the supporting arms have intermediate their ends depending guard plates to which the power-actuated means is connected.

16. In a cradle attachment for a tractor having a main frame and ground supports which include swing frames independently oscillable in a vertical plane about a common axis adjacent one end of the tractor, the combination of: a cross-bolster having at its ends means for engagement with and support by said swing frames; a cross-beam centrally pivotally supported by the cross-bolster independently of the tractor main frame and adapted to support one end of an implement-supporting cradle frame; and means supported adjacent at least one end of the cross-beam to guide oscillation of the swing frames against lateral deflection of the swing frames.

17. In a cradle attachment for a tractor having a main frame and ground supports which include swing frames independently oscillable in a vertical plane about a common axis adjacent one end of the tractor, the combination of: a cross-bolster having at its ends means for engagement with and support by said swing frames; a cross-beam centrally pivotally supported by the cross-bolster independently of the tractor main frame and adapted to support one end of an implement-supporting cradle frame; and bumper means supported adjacent at least one end of the cross-beam to limit vertical oscillation of the cross-bolster.

18. A cradle attachment for a tractor, according to claim 17, further characterized by the fact that the cross-beam has, adjacent at least one end, means to guide oscillation of the swing frames against lateral deflection of the swing frames.

19. In a cradle for mounting an implement on a tractor of the sort having a main frame, support means for one end of the main frame, and support means for the other end of the main frame, the combination of: a cross-beam adapted to be centrally pivotally supported by the second-mentioned support means; a cradle frame adapted at one end thereof to be flexibly connected to the tractor adjacent the first-mentioned support means, and connected at the other end thereof to the ends of the cross-beam; said cradle frame including side members and a hollow torsion box rigidly connecting the side members; means on the cradle frame to support the frame of an implement; and means on the cradle frame to support power-actuated means to operate said implement.

20. A cradle according to claim 19, further characterized by the fact that the cradle frame includes guard plates adapted to overlap a portion of the implement frame in all its operating positions and to stiffen the side members.

21. A cradle according to claim 19, further characterized by having adjacent each end of the cross-beam a bumper for limiting vertical movement of the equalizing support means.

22. In a cradle for mounting an implement on a tractor of the sort having a main frame, first support means connected to the main frame adjacent one end thereof, and second support means remote from the connection of the first support means, the combination of: a cross-beam adapted to be supported by the second support means for relative movement about a longitudinal axis; side members adapted at one end thereof to be flexibly connected to the tractor adjacent said one end of the main frame, and rigidly attached at their other end to the cross beam; a torsion box rigidly attached at its ends to the side members; and means to support an implement frame on the cradle adjacent said torsion box.

23. A cradle according to claim 22, further characterized by the fact that the torsion box is remote from the cross beam.

24. A cradle according to claim 22, further characterized by the fact that the torsion box is adjacent the first support means.

25. In an implement for attachment to a tractor of the sort having a main frame, support means for one end of the main frame, and support means for the other end of the main frame, the combination of: the implement proper; a cradle adapted at one end to be flexibly secured to the tractor at transversely spaced connections adjacent the first-mentioned support means, and at the other end to be centrally pivotally supported along a longitudinal exis by the second-mentioned support means; said cradle including side members and a hollow torsion box rigidly connecting the side members; two supporting arms attached to the implement proper and pivotally supported on a transverse axis by the cradle; and power-actuated means supported by the cradle and operatively connected to the supporting arms whereby the implement proper is manipulated.

26. In a cradle for mounting an implement on a tractor having a main frame, first support means pivotally connected to the main frame adjacent one end thereof, and second support means, the combination of: a torsion box; means whereby the two ends of the torsion box may support an implement; means to support the torsion box on the tractor so that such support is adjacent said one end of the main frame; and brace means operatively attached to the torsion box, and to the second support means at a point remote from the pivot of the first support means, to brace the torsion box against fore-and-aft movement about its support.

27. A cradle according to claim 26, further characterized by the fact that the means to support the torsion box on the tractor is adapted to be connected to the tractor adjacent the pivot of the first support means.

GEORGE W. MORK.

REFERENCES CITED

The following references are of record in the file of this patent:

UNITED STATES PATENTS

| Number | Name | Date |
|---|---|---|
| 2,269,775 | Le Bleu | Jan. 13, 1942 |
| 2,274,904 | Lawler | Mar. 3, 1942 |
| 2,376,181 | Petersen et al. | May 15, 1945 |
| 2,377,495 | Hofmeister | June 5, 1945 |
| 2,396,407 | Austin | Mar. 12, 1946 |
| 2,426,544 | Wooldridge | Aug. 26, 1947 |